United States Patent
Beutel et al.

(10) Patent No.: US 9,911,988 B2
(45) Date of Patent: Mar. 6, 2018

(54) SUBGASKET DESIGN TO DISSIPATE THERMAL ENERGY GENERATED FROM CATALYTIC COMBUSTION EXPERIENCED IN A PEM FUEL CELL

(71) Applicant: GM Global Technology Operations LLC, Detroit, MI (US)

(72) Inventors: Matthew J. Beutel, Webster, NY (US); Christopher J. Towner, Hamlin, NY (US); John C. Fagley, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1040 days.

(21) Appl. No.: 13/644,777

(22) Filed: Oct. 4, 2012

(65) Prior Publication Data
US 2014/0099564 A1    Apr. 10, 2014

(51) Int. Cl.
| | |
|---|---|
| *H01M 8/10* | (2016.01) |
| *H01M 8/04007* | (2016.01) |
| *H01M 8/0273* | (2016.01) |
| *H01M 8/1018* | (2016.01) |

(52) U.S. Cl.
CPC ..... *H01M 8/04067* (2013.01); *H01M 8/0273* (2013.01); *H01M 2008/1095* (2013.01)

(58) Field of Classification Search
CPC .......................... H01M 8/0273; H01M 8/0276
See application file for complete search history.

(56) References Cited

U.S. PATENT DOCUMENTS

| | | | |
|---|---|---|---|
| 6,861,173 B2 | 3/2005 | Bhaskar et al. | |
| 8,007,949 B2 | 8/2011 | Sompalli et al. | |
| 2005/0089746 A1* | 4/2005 | James et al. | 429/35 |
| 2006/0141328 A1* | 6/2006 | Johnston et al. | 429/38 |
| 2007/0196718 A1* | 8/2007 | Leistra et al. | 429/36 |
| 2008/0107944 A1* | 5/2008 | Goebel | 429/26 |
| 2009/0035634 A1* | 2/2009 | Ohma | 429/30 |
| 2011/0003185 A1 | 1/2011 | Kritzer | |

FOREIGN PATENT DOCUMENTS

| | | |
|---|---|---|
| DE | 10393467 B4 | 2/2009 |
| DE | 112004002926 B4 | 6/2009 |
| DE | 202010016259 U1 | 2/2011 |

* cited by examiner

*Primary Examiner* — Jimmy K Vo
(74) *Attorney, Agent, or Firm* — Brooks Kushman P.C.

(57) ABSTRACT

A fuel cell component includes a sub-gasket including a structural component and a thermally conductive layer. The sub-gasket defines a central opening while the structural component includes a first side and a second side. The sub-gasket also has an inner portion proximate to the central opening and an outer portion. The inner portion is positioned between the cathode layer outer edge and the ion-conducting membrane outer edge or between the anode layer outer edge and the ion-conducting membrane outer edge. Finally, the thermally conductive layer contacts the second side of the structural component. Advantageously, the thermally conductive layer dissipates locally generated heat caused by unintended particles falling on the sub-gasket.

11 Claims, 6 Drawing Sheets

SUBGASKET DESIGN TO DISSIPATE THERMAL ENERGY GENERATED FROM CATALYTIC COMBUSTION EXPERIENCED IN A PEM FUEL CELL

BACKGROUND OF THE INVENTION

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane (i.e., ion conducting membrane) has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles) supported on carbon particles to promote oxidation of hydrogen at the anode, and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL") which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Some prior art fuel cells include sub-gaskets between the catalyst electrodes and ion conducting membrane. During manufacture and operation of a fuel cell, it is possible that one or more catalyst containing particles can become attached to the sub-gasket, and these unintended particles are capable of generating levels of thermal energy that have the ability to elevate temperatures of polymer based sub-gasket material to their melt temperatures when exposed to combustible mixtures of hydrogen and oxygen. The fuel cell stack is regularly exposed to such combustible mixtures as a method to start the fuel cell from freeze conditions or during anode bleed to the cathode to purge nitrogen. In many cases, the sub-gasket material becomes the primary thermal conduction media for the energy generated. Although the prior art subgasket designs work reasonably well during normal operation, these particles represent a manufacturing defect that can overwhelm the thermal properties of these sub-gaskets.

Accordingly, the present invention provides improved designs for dissipating the thermal energy generated by unintended particles resulting in localized heating in a fuel cell.

SUMMARY OF THE INVENTION

The present invention solves one or more problems of the prior art by providing in at least one embodiment a fuel cell component for dissipating heat. The fuel cell component includes a sub-gasket including a structural component and a thermally conductive layer. The sub-gasket defines a central opening while the structural component includes a first side and a second side. The sub-gasket also has an inner portion proximate to the central opening and an outer portion. The inner portion is positioned between the cathode layer outer edge and the ion-conducting membrane outer edge or between the anode layer outer edge and the ion-conducting membrane outer edge. Finally, the thermally conductive layer contacts the second side of the structural component. Advantageously, the thermally conductive layer is tailored to dissipate heat energy. Based on thickness of layer the thermal energy can be dissipated before the sub-gasket is exposed to thermal energy (or melt temp) that will cause premature failure (i.e., melting of polymer sub-gasket layer which results in anode and cathode streams mixing).

In another embodiment, a fuel cell component is provided. The fuel cell component includes a cathode catalyst layer having a cathode layer outer edge, an anode catalyst layer having an anode layer outer edge, an ion-conducting membrane, a sub-gasket, and a shim. The ion-conducting membrane has an ion-conducting membrane outer edge interposed between the cathode catalyst layer and the anode catalyst layer. The sub-gasket includes a structural component and a thermally conductive layer and defines a central opening. The structural component has a first side and a second side while the sub-gasket having an inner portion proximate to the central opening and an outer portion. The inner portion is positioned between the cathode catalyst layer outer edge and the ion-conducting membrane outer edge or between the anode catalyst layer outer edge and the ion-conducting membrane outer edge. The thermally conductive layer contacts the second side of the structural component. Finally, the shim contacts the thermally conductive layer.

In yet another embodiment, a fuel cell component for providing thermal dissipation within a polymer layer is provided. The fuel cell component includes a sub-gasket having a first side, a second side, and a peripheral section that defines a central opening. The peripheral section has an inner portion proximate to the central opening and an outer portion. The proximate section is positionable between a fuel cell cathode layer outer edge and a fuel cell ion-conducting membrane outer edge or between a fuel cell anode layer outer edge and a fuel cell ion-conducting membrane outer edge. The central opening is aligned in a fuel cell such that a fuel cell active region is positioned therein. The fuel cell component also includes a thermally conductive layer adhered to the outer region of the sub-gasket and a shim contacting the second side of the sub-gasket.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
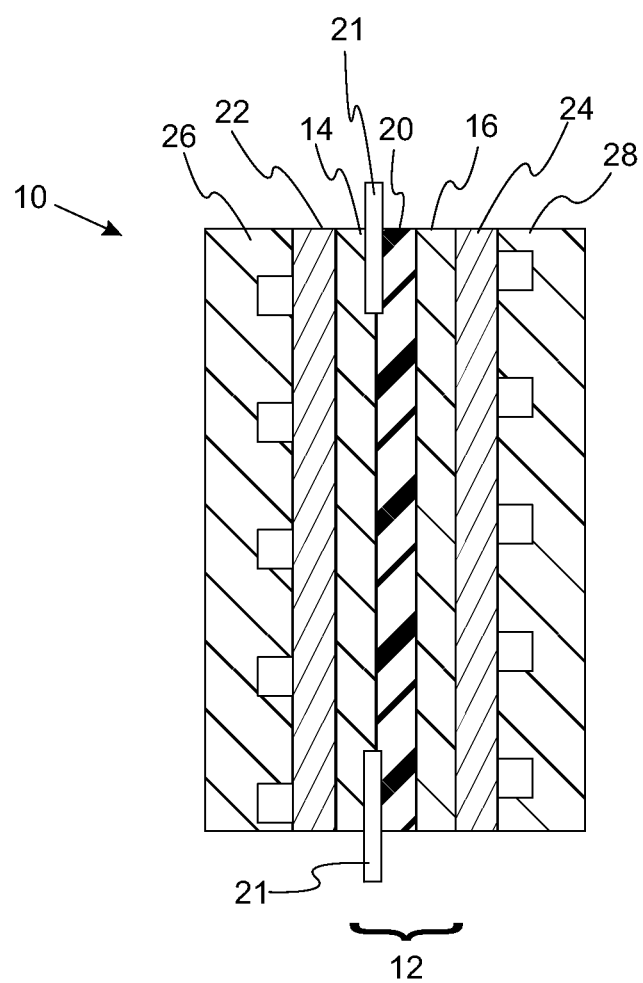
FIG. 1 provides a schematic illustration of a fuel cell incorporating a separator.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a schematic cross section of a fuel cell that incorporates an embodiment that incorporates a sub-gasket is provided. Fuel cell 10 includes the membrane electrode assembly 12 which includes anode catalyst layer 14, cathode catalyst layer 16, and ion conducting membrane (i.e., proton exchange membrane, ionomer, etc.) 20. Ion conducting membrane 20 is interposed between anode catalyst layer 14 and cathode catalyst layer 16 with anode catalyst layer 14 disposed over the first side of ion conducting membrane 20, and cathode catalyst layer 16 disposed over the second side of ion conducting membrane 20. A portion of sub-gasket 21 is interposed between anode catalyst layer 14 and ion conducting membrane 20. The details of sub-gasket 21 are set forth below. In a variation, fuel cell 10 also includes porous gas diffusion layers 22 and 24. Gas diffusion layer 22 is disposed over anode catalyst layer 14 while gas diffusion layer 24 is disposed over cathode catalyst layer 16. The fuel cell 10 includes anode flow field plate 26 disposed over gas diffusion layer 22, and cathode flow field plate 28 disposed over gas diffusion layer 24.

Figure 2:
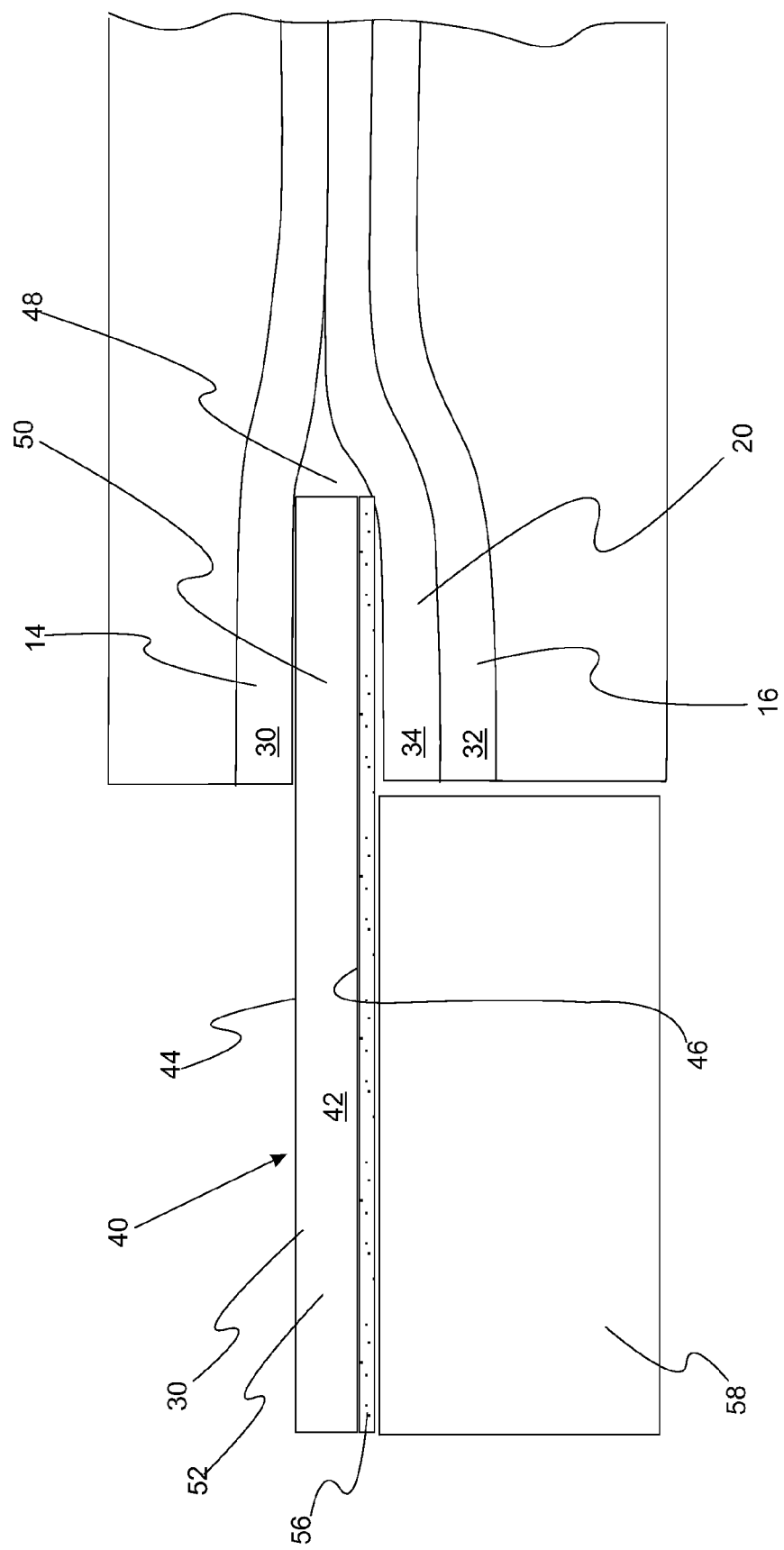
FIG. 2 is a schematic cross section of a fuel cell incorporating the sub-gasket.
Figure 3:
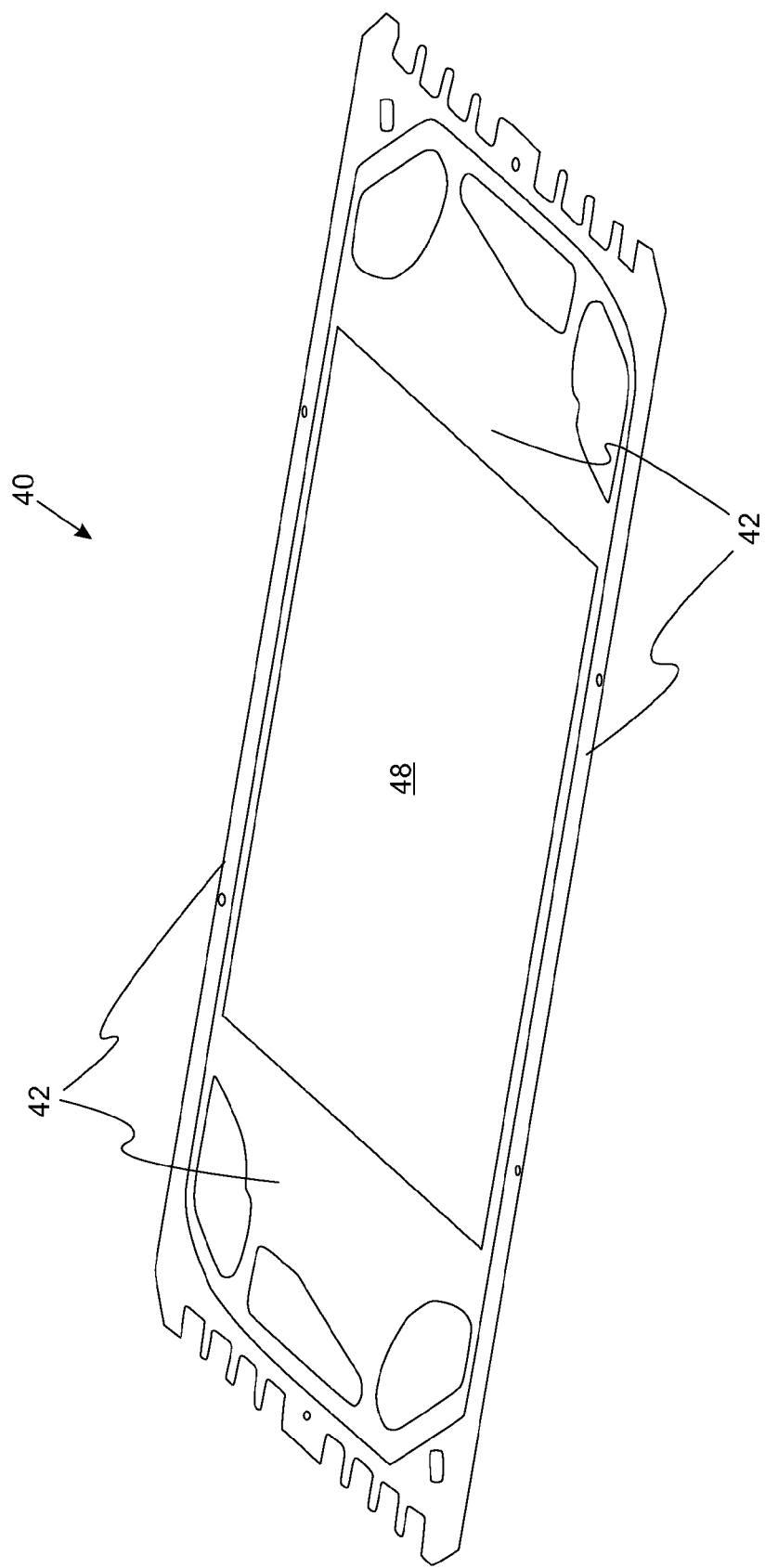
FIG. 3 is a perspective view of the sub-gasket.

With reference to FIGS. 2 and 3, a sub-gasket for fuel cell applications is provided. FIG. 2 is a schematic cross section of a fuel cell incorporating the sub-gasket. FIG. 3 is a perspective view of the sub-gasket. Fuel cell 10 includes anode catalyst layer 14 having an anode layer outer edge 30 and cathode catalyst layer 16 which has cathode layer outer edge 32. Ion-conducting membrane 20 has ion-conducting membrane outer edge 34. As set forth above, ion-conducting membrane 20 is interposed between anode catalyst layer 14 and cathode catalyst layer 16. Sub-gasket 40 includes structural component 42 which has first side 44 and second side 46. Typically, structural component 42 is a polymeric component able to withstand temperatures from 0° C. to 150° C. without substantial degradation (e.g., melt temperature 250° C. to 260° C.). In a refinement, structural component 42 comprises an ester such as polyethylene naphthalate and polyethylene terephthalate (PET). Additional polymers that can be used for structural component 42 include, but are not limited to, polyimides (e.g., KAPTON™), thermoplastics (e.g., poly(p-phenylene sulfide)) and other types of polymers that can operate effectively with respect to temperature, hydrogen and oxygen permeation, and modulus. In another variation, structural component 42 has a thickness from about 1 to 3 mil. Structural component 42 defines central opening 48. Structural component 42 includes inner portion 50 proximate to central opening 48 and an outer portion 52. The inner portion 50 is positioned between cathode layer edge 32 and ion-conducting membrane outer edge 34 or between anode layer outer edge 30 and ion-conducting membrane outer edge 34. Sub-gasket 40 includes thermally conductive layer 56 that is adhered to the second side of sub-gasket 40. In a refinement, thermally conductive layer 56 has a thickness from about 5 microns to about 50 microns. In particular, when thermally conductive layer 56 includes a metal layer and an adhesive, the metal layer can be about 5 microns while the adhesive layer is about 25 microns. Shim 58 contacts thermally conductive layer 56. Typically, shim 58 includes a polymer such as an ester (polyethylene naphthalate). In yet another refinement, shim 58 has a thickness from about 2 to 6 mil. Shim 58 provides structural support, limits plate flexing due to pressure differentials in feed region, and provides hard stop to control plate to plate spacing.

Figure 4:
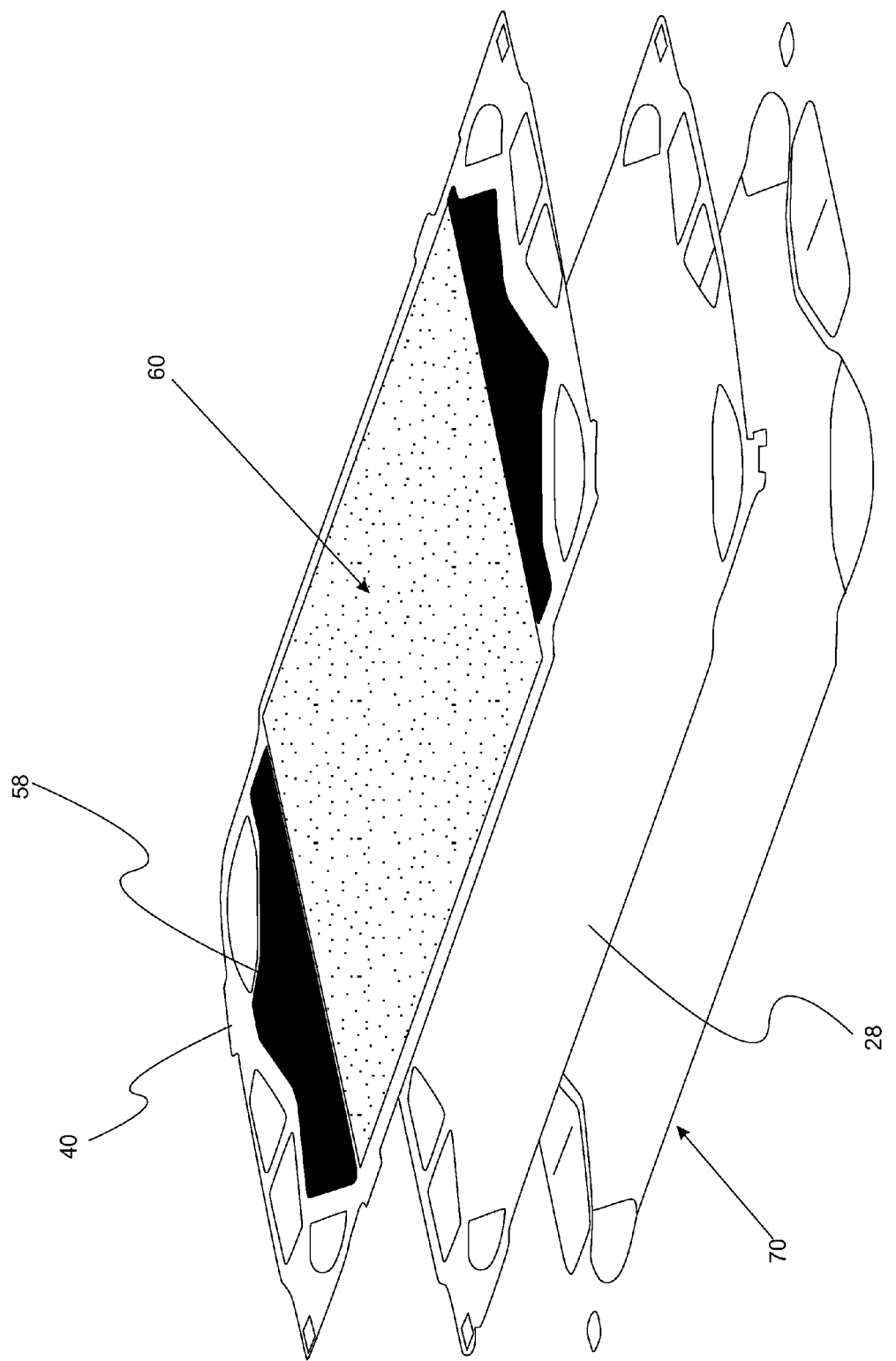
FIG. 4 is a partial exploded view of a fuel cell incorporating a sub-gasket.
Figure 5:
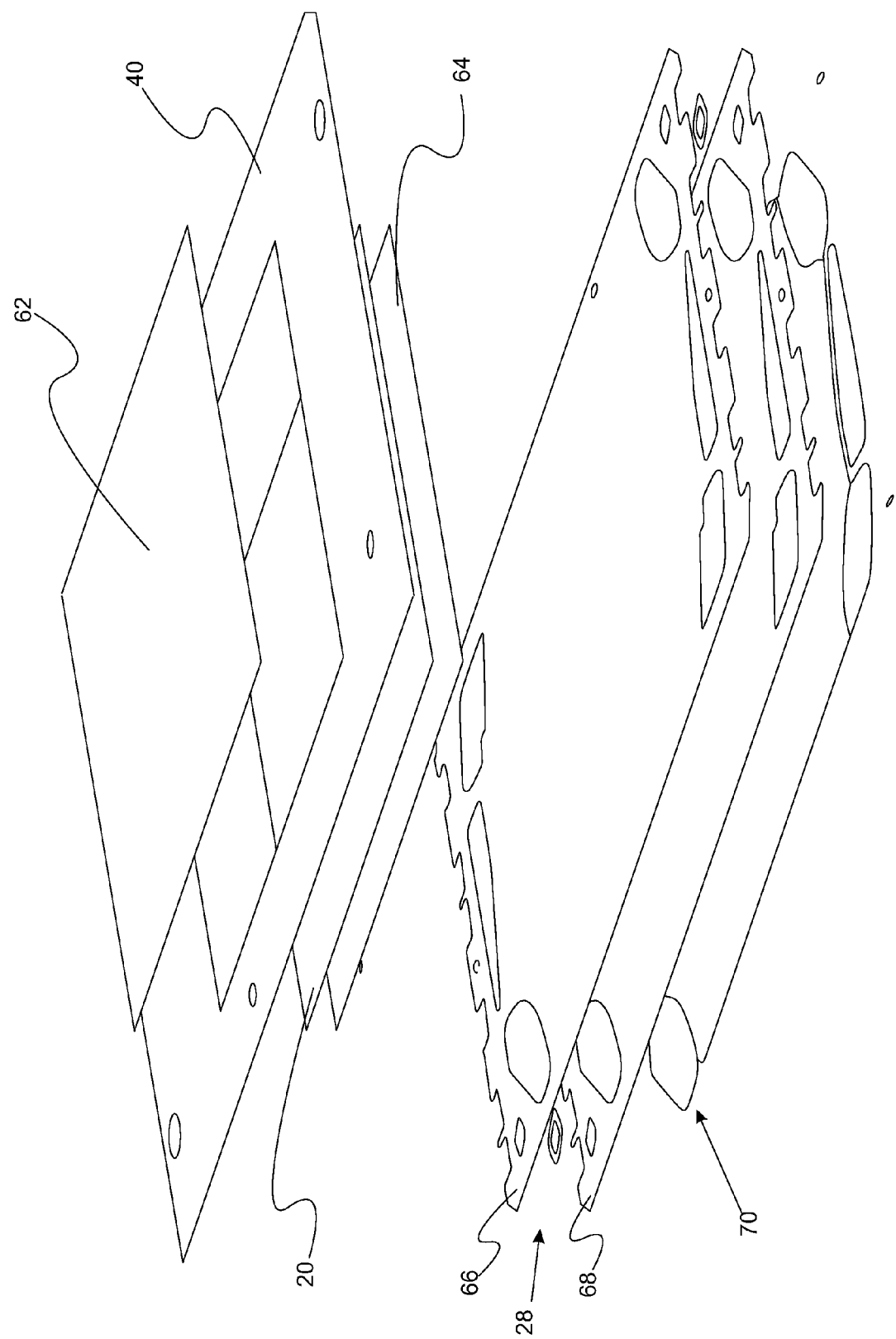
FIG. 5 is an exploded view of the fuel cell incorporating a sub-gasket.

FIGS. 4 and 5 provide exploded views showing integration of sub-gasket 40 into a fuel cell. Fuel cell 10 includes active area 60 which includes anode catalyst layer/gas diffusion medium combination 62, cathode catalyst layer/ gas diffusion medium 64, and ion conducting membrane 20. Anode catalyst layer/gas diffusion medium combination 62 is disposed over ion conducting membrane 20 with sub-gasket 40 interposed between the edge regions of anode catalyst layer/gas diffusion medium combination 62 and ion conducting membrane 20. Ion conducting membrane 20 is disposed over cathode catalyst layer/gas diffusion medium 64. Cathode flow field plate 28 includes cathode plate half 66 and cathode plate half 68. It should be appreciated that a plurality of the fuel cell units depicted in FIGS. 4 and 5 are typically stacked to form a fuel cell stack. FIG. 4 also depicts shim 58. Seal 70 is used to effect sealing between fuel cell units in such stacks.

Figure 6:
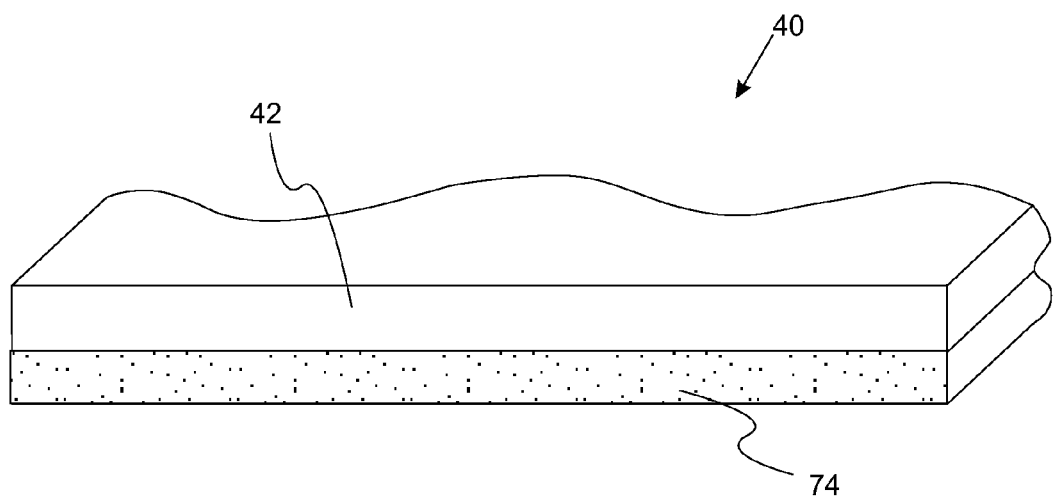
FIG. 6 provides a perspective view of a section of a sub-gasket having a thermally conductive adhesive.
Figure 7:
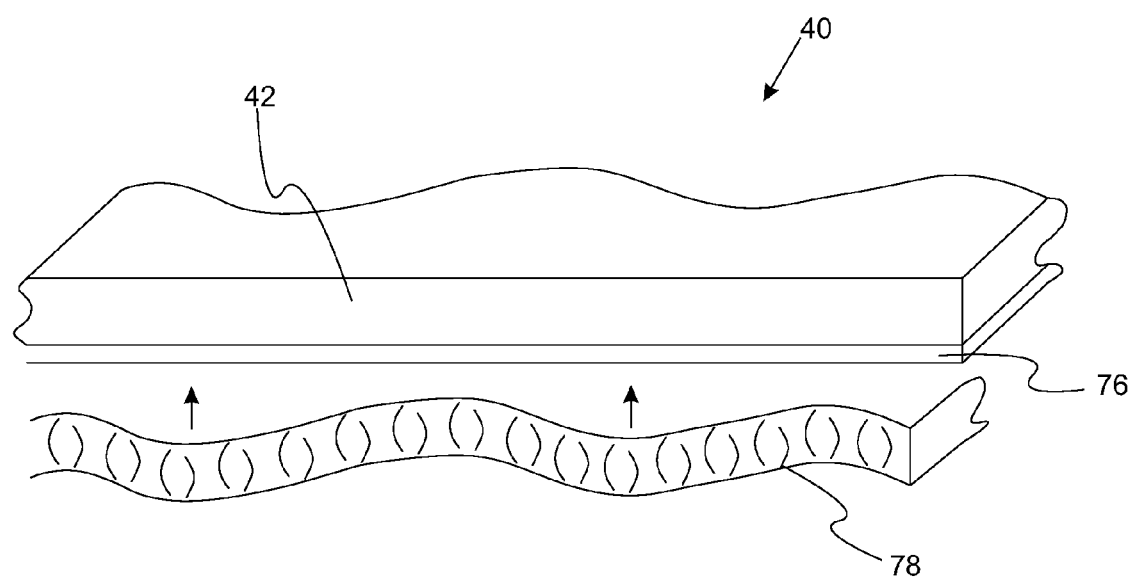
FIG. 7 provides a perspective view of a sub-gasket having a thermally conductive metal layer.

With reference to FIGS. 6 and 7, variations of the sub-gasket are provided. FIG. 6 provides a perspective view of a section of a sub-gasket having a thermally conductive adhesive. In this variation, adhesive layer 74 (layer 56 of FIG. 2) is adhered to structural component 42. Adhesive layer 74 is formed from an adhesive with conductive particles dispersed therein. In a refinement, the thermally conductive particles include a component selected from the group consisting of carbon, silver, copper, nickel, steel, other metals, metal alloys, and combinations thereof. In another refinement, the adhesive is a thermally activated adhesive such as polyesters, thermoplastics, polyurethanes, polyalcohol polymers, polyamine polymers, ethylene copolymers, epoxies, urethanes, polyimides, and combinations thereof. More specific examples of the adhesive include, but are not limited to, ethylene acrylic copolymers, ethylene-vinyl acetate, and combinations thereof. Typically, the adhesive melts or solidifies at a temperature from about 50° C. to about 125° C. In another refinement, the adhesive melts or solidifies at a temperature from about 50° C. to about 95° C.

FIG. 7 provides a perspective view of a sub-gasket having a thermally conductive metal layer. In this variation, metal layer 76 (between layer 56 and 42 of FIG. 2) is disposed over and contacts structural component 42. In a refinement, metal layer 76 is a metallic film deposited on the sub-gasket or a metal foil contacting the sub-gasket. Such metal layers may be deposited by sputtering, evaporation, chemical vapor deposition, and the like. In another refinement, adhesive layer 78 is disposed over metal layer 76 to provided adhesion to shim 58 (FIG. 2).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel cell component comprising:
a cathode catalyst layer having a cathode catalyst layer outer edge;
an anode catalyst layer having an anode catalyst layer outer edge;
an ion-conducting membrane having an ion-conducting membrane outer edge, the ion-conducting membrane interposed between the cathode catalyst layer and the anode catalyst layer;
a sub-gasket including a polymeric layer and a thermally conductive layer, the thermally conductive layer being an adhesive layer, the sub-gasket defining a central opening, the polymeric layer having a first side opposite a second side, the sub-gasket having an inner portion proximate to the central opening and an outer portion, the inner portion being positioned between the cathode catalyst layer outer edge and the ion-conducting membrane outer edge or between the anode catalyst layer outer edge and the ion-conducting membrane outer edge with the inner portion contacting the ion-conducting membrane at the inner portion, the thermally conductive layer contacting the second side of the polymeric layer, the thermally conductive layer including a metal layer disposed between the second side of the polymeric layer and the adhesive layer; and
a shim that contacts the adhesive layer at the outer portion of the sub-gasket.

2. The fuel cell component of claim 1 wherein the sub-gasket comprises a polyester.

3. The fuel cell component of claim 1 wherein the sub-gasket comprises polyethylene naphthalate.

4. The fuel cell component of claim 1 wherein the thermally conductive layer comprises thermally conductive particles dispersed within an adhesive.

5. The fuel cell component of claim 4 wherein the thermally conductive particles include a component selected from the group consisting of carbon, silver, copper, nickel, steel, other metals, and metal alloys.

6. The fuel cell component of claim 4 wherein the adhesive is a thermally activated adhesive.

7. The fuel cell component of claim 4 wherein the adhesive comprises a component selected from the group consisting of polyesters, thermoplastics, polyurethanes, polyalcohol polymers, polyamine polymers, ethylene copolymers, epoxies, urethanes, polyimides, and combinations thereof.

8. The fuel cell component of claim 4 wherein the adhesive comprises a component selected from the group consisting of ethylene acrylic copolymers, ethylene-vinyl acetate, and combinations thereof.

9. The fuel cell component of claim 4 wherein the adhesive melts at a temperature from about 50° C. to about 125° C.

10. A fuel cell component for providing thermal dissipation within a polymer layer, the fuel cell component comprising:
a sub-gasket including a polymeric layer and having a first side, a second side, and a peripheral section that defines a central opening, the peripheral section having an inner portion proximate to the central opening and an outer portion, the peripheral section being positioned between a fuel cell cathode layer outer edge of a cathode catalyst layer and a fuel cell ion-conducting membrane outer edge of an ion-conducting membrane or between a fuel cell anode layer outer edge of an anode catalyst layer and the fuel cell ion-conducting membrane outer edge with the inner portion adapted to contact the ion-conducting membrane at the inner portion, the central opening alignable in a fuel cell such that a fuel cell active region is positioned therein;
the ion-conducting membrane interposed between the cathode catalyst layer and the anode catalyst layer;
a thermally conductive layer being an adhesive layer, wherein the thermally conductive layer adhered to the outer portion of the sub-gasket, the thermally conductive layer including a metal layer disposed between a side of the polymeric layer and the adhesive layer;
a shim that contacts the adhesive layer at the outer portion of the sub-gasket.

11. The fuel cell component of claim 10 wherein the thermally conductive layer comprises thermally conductive particles dispersed within an adhesive.

* * * * *